United States Patent [19]

Halow

[11] Patent Number: 5,895,508
[45] Date of Patent: Apr. 20, 1999

[54] DOWN-FLOW MOVING-BED GASIFIER WITH CATALYST RECYCLE

[75] Inventor: John S. Halow, Waynesburg, Pa.

[73] Assignee: The United States of America as represented by the United States Department of Energy, Washington, D.C.

[21] Appl. No.: 08/694,575

[22] Filed: Aug. 9, 1996

[51] Int. Cl.[6] .................................................. C10J 3/20
[52] U.S. Cl. .................. 48/77; 48/63; 48/76; 48/DIG. 4; 502/518
[58] Field of Search ........................... 48/77, 63, 76, 48/DIG. 4; 502/518

[56] References Cited

U.S. PATENT DOCUMENTS

| | | |
|---|---|---|
| 2,554,263 | 5/1951 | Nelson . |
| 2,689,786 | 9/1954 | Hubmann . |
| 2,691,573 | 10/1954 | Mayland . |
| 2,743,217 | 4/1956 | Silsby . |
| 3,615,299 | 10/1971 | Fischer et al. . |
| 3,804,606 | 4/1974 | Archer et al. . |
| 3,847,563 | 11/1974 | Archer et al. . |
| 4,300,914 | 11/1981 | Rice . |
| 4,347,064 | 8/1982 | Reh et al. . |
| 4,441,892 | 4/1984 | Schuster . |
| 5,133,780 | 7/1992 | Sadowski . |
| 5,145,490 | 9/1992 | Sadowski . |

*Primary Examiner*—Ponnathapura Achutamurthy
*Attorney, Agent, or Firm*—Lisa A. Jarr; Stephen D. Hamel; William R. Moser

[57] ABSTRACT

The gasification of coal and other carbonaceous materials by an endothermic gasification reaction is achieved in the presence of a catalyst in a down-flow, moving-bed gasifier. Catalyst is removed along with ash from the gasifier and is then sufficiently heated in a riser/burner by the combustion of residual carbon in the ash to volatilize the catalyst. This volatilized catalyst is returned to the gasifier where it uniformly contacts and condenses on the carbonaceous material. Also, the hot gaseous combustion products resulting from the combustion of the carbon in the ash along with excess air are introduced into the gasifier for providing heat energy used in the endothermic reaction.

6 Claims, 1 Drawing Sheet

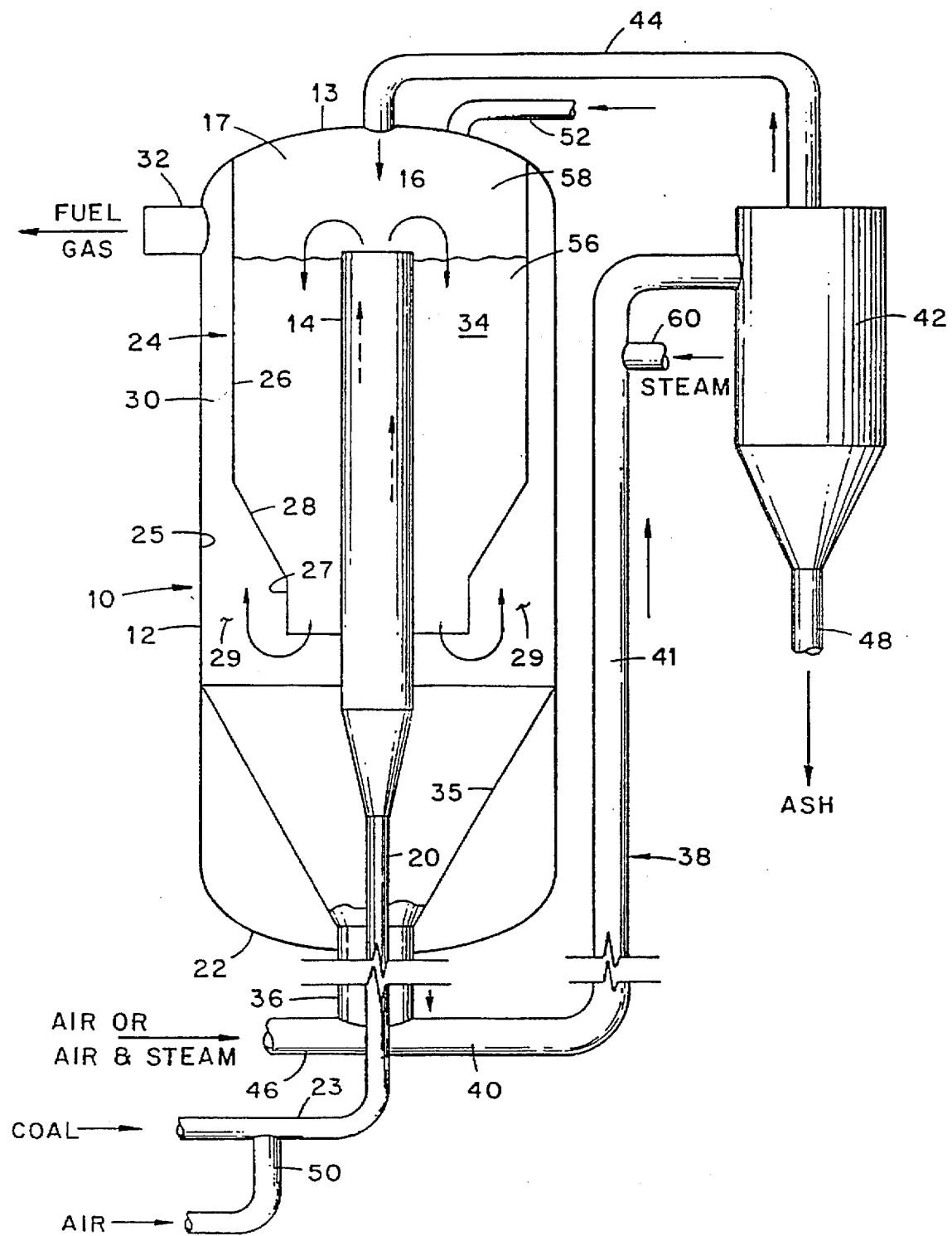

ns, or sub-bituminous coal in down-flow moving-bed gasifiers and employing catalytic material for enhancing the gasification cycle and, more particularly, to such gasification of carbonaceous materials wherein the catalytic material is recycled in the operation and with the recycled catalyst being uniformly distributed over the carbonaceous material.

DOWN-FLOW MOVING-BED GASIFIER WITH CATALYST RECYCLE

The United States Government has rights in this invention pursuant to the employer-employee relationship of the U. S. Department of Energy and the inventor.

BACKGROUND OF THE INVENTION

The present invention relates generally to the production of fuel gas by the gasification of carbonaceous materials such as bituminous, or sub-bituminous coal in down-flow moving-bed gasifiers and employing catalytic material for enhancing the gasification cycle and, more particularly, to such gasification of carbonaceous materials wherein the catalytic material is recycled in the operation and with the recycled catalyst being uniformly distributed over the carbonaceous material.

Moving-bed gasifiers have a proven capability for the efficient conversion of chemical energy contained in carbonaceous materials such as coal, peat, biomass and the like, into product or fuel gases having relatively high BTU values. A highly efficient conversion of the solid carbonaceous material to fuel gas is achieved by employing a countercurrent flow operation in the gasifier whereby particulate carbonaceous material is converted to char and then ash as it flows downwardly in the gasifier countercurrently to an upwardly rising stream of air or air and steam so that the fuel gases are produced by an endothermic reaction with the carbonaceous material and char at relatively high temperatures. Also, this countercurrent flow operation allows some of the sensible heat in the fuel gas to be returned to the reaction zone.

Recent improvements in moving-bed gasifiers for the production of fuel gas from carbonaceous materials utilize a coal pyrolysis cycle in combination with the coal gasification cycle for increasing the coal conversion efficiency while reducing problems associated with the production of tars, coal agglomeration and caking, and the entrainment of fines in the fuel gas. Such an improved moving-bed gasifier is described in U.S. Pat. No. 5,145,490, issued Sep. 8, 1992, which is specifically incorporated herein by reference. In this patented gasifier, a closed end pressure vessel is provided with a discharge for the fuel gas that is in a location removed from the closed end of the pressure vessel so as to significantly reduce the carry over of tars and fines into the fuel gas. This patented gasifier is also provided with a pyrolyzer coaxially disposed within the pressure vessel where the coal is pyrolyzed in the presence of air before being discharged into the high temperature region of the gasifier near the upper end of the pressure vessel. This solid pyrolyzed material that is discharged from the pyrolyzer is in the form of char and descends through a gasification zone surrounding the pyrolyzer and onto a rotating grate. As this char descends through the gasification zone, steam and air are introduced through the base and top of the gasifier to endothermically react with the hot char to provide the gasification reactions for producing the fuel gas. These endothermic gasification reactions are limited to minimum temperatures of about 1700° F. for bituminous coals and about 1500° F. for sub-bituminous coals and thus limit the chemical conversion efficiency that can be achieved.

While not utilized in the gasification reaction described in the aforementioned patent, catalysts such as potassium compounds including potassium carbonate, potassium acid carbonate, and potassium chloride or other compounds such as sodium carbonate, sodium chloride, or calcium oxide have been previously used in gasification cycles to significantly increase the gasification rates even at endothermic gasification reaction temperatures as low as about 1200°–1300° F. Also, at temperatures of about 1400°–1500° F. an exothermic hydrogen/carbon reaction occurs to form methane which releases heat for continuing to drive the endothermic gasification steam/carbon and $CO_2$/carbon reactions utilized for producing the fuel gas at temperatures as low as about 1200°–1300° F. However, the problems associated with using catalysts as in previously known gasification systems such as described in the aforementioned patent, is the requirement for providing a uniform distribution of the catalyst across the bed of coal or char particulates in order to ensure the efficient use of the catalyst and, more importantly, the attendant economic problems associated with the loss of catalyst as it is discharged along with the ash from the gasifier. The separation of the catalyst from this ash creates a significant economic burden upon the utilization of catalyst in the gasification cycle due to the difficulties previously encountered during attempts to efficiently separate the catalyst from the ash.

SUMMARY OF THE INVENTION

Accordingly, it is a principal aim or objective of the present invention to provide a down-flow moving-bed gasification method and apparatus which employs a catalyst recycle system capable of effectively recovering catalytic material from the ash and uniformly distributing the recovered catalyst over the carbon-containing char within the gasification zone of the gasifier so as to significantly increase the production of the fuel gas, especially fuel gas with higher BTU values than previously achieved in moving-bed gasifiers.

Generally, this objective of the present invention is achieved in downward-flow, moving-bed gasifiers having a closed end pressure vessel containing a central pyrolysis chamber encompassed by an annular gasification zone and an annular product gas discharge region downwardly spaced from the top of the vessel. A riser/burner is coupled to the pressure vessel to receive catalyst-supporting ash from the gasification zone and effect the combustion of residual carbon in this ash for vaporizing the catalyst. The vaporized catalyst along with the hot gaseous combustion products from the riser/burner are recycled into the top of the gasifier for providing the heat required for the endothermic gasification reaction as well as for uniformly distributing the condensable catalyst over the char in the gasification zone.

More specifically, the apparatus of the present invention comprises: a gasification vessel containing a downward moving bed of carbonaceous material; a first conduit means for introducing a stream of carbonaceous material and air into the gasification vessel at a rate sufficient to maintain said bed of carbonaceous material; means for introducing steam into the gasification vessel in an amount sufficient for the gasifications within the vessel; means for initially introducing a quantity of catalyst into the gasification vessel in an amount sufficient to promote the gasification of the carbonaceous material in the bed of carbonaceous material in the presence of the air by means of an endothermic reaction for producing fuel gas and solid gasification products containing residual carbon; a second conduit means for removing the fuel gas from the enclosed volume; a combustion chamber means separate from the gasification vessel; a third conduit means for conveying solid gasification products including any of the catalyst supported thereby from the enclosed volume into the combustion chamber means; a fourth conduit means for introducing a stream of air into the combustion chamber means in an amount at least sufficient for supporting exothermic combustion of residual carbon in the solid gasification products to produce solid and gaseous combustion products and provide a temperature in the combustion chamber means sufficient to volatilize the catalyst supported on the solid gasification products; a particulate removing means coupled to the combustion chamber means for separating solid combustion products from the gaseous combustion products and the volatilized catalyst; and, a fifth conduit means coupled to the particulate removing means and said enclosed volume for conveying the volatilized catalyst and the gaseous combustion products into the gasification vessel for providing heat energy for driving the endothermic gasification reaction and for the contact of the volatilized catalyst with the carbonaceous material in the bed of carbonaceous material.

Other objects and many of the attendant advantages of the present invention will become apparent to those skilled in the art upon an understanding and use of the illustrative embodiment described and claimed herein below.

BRIEF DESCRIPTION OF THE DRAWING

The single FIGURE is a schematic view showing a down-flow moving-bed gasifier in combination with an external riser/burner arrangement in accordance with the present invention for the effective recovery and recycling of catalytic material used in the gasification of carbonaceous material.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

The down-flow moving-bed gasifier of the present invention generally comprises a gasification vessel containing a central pyrolyzer section with an annular gasification section or zone surrounding the pyrolyzer and a product gas discharger annulus disposed about an upper region of gasification zone substantially as described in the aforementioned patent except for some differences as will be discussed below.

With reference to the FIGURE, the down-flow moving-bed gasifier 10 of the present invention is operable at pressures in the range of about ambient to about 10 atmospheres and at temperatures in the range of about 1200° to 2200° F. The gasifier 10 comprises an enclosed, vertically oriented housing or pressure vessel 12 with a closed, generally dome-shaped, upper end wall 13. The pressure vessel 12 preferably contains a vertically extending pyrolyzer chamber 14 of a tubular or cylindrical configuration that is coaxially aligned with the vertical longitudinal axis of the pressure vessel 12 and is provided with an upper open end 16 which communicates with the upper region 17 of the pressure vessel 12 at a location vertically spaced from but near the end wall 13. The bottom end of the pyrolyzer chamber 14 is shown with an inwardly and downwardly tapered configuration to define a reactant feed tube 20 which extends through the base 22 of the pressure vessel 12 and is connected by line 23 to a suitable supply (not shown) of the coal or other carbonaceous material that is to be gasified in the gasifier 10 for the production of fuel gas.

The pressure vessel 12 further includes an annular wall 24 that is fixedly attached in an air tight manner to the upper end wall 13 and disposed at a location uniformly spaced from the inside cylindrical walls 25 of the pressure vessel 12. This annular wall 24 vertically extends into the pressure vessel 12 to a location below the open end 16 of the pyrolyzer chamber 14 and near the vertical bottom point of the cylindrical walls 25 of the pressure vessel 12. The annular wall 24 is defined by an upper cylindrical portion 26 and a lower, small diameter, portion 27 with a conical transition 28 therebetween. The annular wall 24 is open at the bottom thereof as generally shown at 29 for receiving fuel gas produced by the gasification reaction. The fuel gas passes upwardly through the annulus 30 defined by the annular wall 24 and the side walls 25 through a discharge line 32 located near the top of the pressure vessel 12. The annular space between the pyrolyzer chamber 14 and the annular wall 24 and the side walls 25 below the annular wall 24 defines an annular gasification zone 34.

At a location below the opening 29 into the fuel gas discharge annulus 30, the gasifier vessel 12 is provided with a generally cone-shaped chute 35 which tapers downwardly and inwardly where it is coupled to a standpipe 36 vertically extending through the base 22 of the pressure vessel 12. The standpipe 36 receives the carbon-containing solid gasification products, i.e., ash, resulting from the gasification of the carbonaceous material in the gasifier.

The standpipe 36 communicates with a riser/burner 38 that is defined by a tubular section 40 communicating with the base of the standpipe 36 and with a substantially vertically oriented section 41 extending therefrom to a particulate separating mechanism, preferably a cyclone 42. A conduit 44 is shown extending from the cyclone 42 to an opening 45 near or in the end wall 13 of the pressure vessel 12 for conveying vaporous catalytic material and gaseous products generated in the riser/burner 38 into the upper region 17 of the pressure vessel 12 as will be described in greater detail below. A conduit 46 is shown coupled to the tubular section 40 for introducing a stream of air or a stream of steam and air into the riser/burner 38 near the coupling of the standpipe 36 with the tubular section 40. This stream of air or air and steam entrains and propels the solid gasification products emanating from the standpipe 36 upwardly through the riser/burner 38 and provides the combustion supporting medium for the combustion of residual carbon contained on the ash discharged from the pressure vessel 12 for volatilizing the catalyst supported on the ash and producing gaseous combustion products. The cyclone 42 is utilized for separating the essentially carbon-free solid ash particulates from the gaseous combustion products and the volatilized catalyst. This ash is then discharged from the cyclone 42 via conduit 48 while the gaseous products containing little or no solid fines and the vaporized catalyst are conveyed through conduit 44 into the gasification zone 34.

In the present invention the carbonaceous material to be gasified is preferably coal, bituminous or sub-bituminous, in particulate form of a size of about 0.25 inch or less, and a stream of air at a sub-stoichiometric amount corresponding to about 20 to 30 percent of the stoichiometric amount required for the combustion of the coal are introduced through line 50 into the coal feed line 23 coupled to the pyrolyzer chamber 14 for the pyrolysis of the coal by an exothermic reaction. During this pyrolysis reaction, various tars and asphalts are produced at a reaction temperature in the range of about 1300°–1900° F. The stream of air introduced into the pyrolyzer chamber 14 through conduit 50 also fluidizes the coal particulates within the pyrolyzer chamber 14 for enhancing the pyrolysis of the coal. A gasification catalyst such as described above, preferably a potassium compound because of its high activity and capability of substantially enhancing the gasification operation, is initially introduced into the pressure vessel 14 through a suitable conduit such as shown at 52 or along with the initial coal supply in line 23. In addition to the production of carbon-rich tars and asphalts, and gaseous volatiles such as methane, carbon monoxide, and water are also produced in the pyrolyzer chamber 14 during the conversion of the coal into relatively non-sticky particulate char. These tars, asphalts and gaseous volatiles and the solid pyrolysis products, i.e., the char, along with any catalyst initially charged on the coal as described above are discharged from the open top end 16 of the pyrolyzer chamber 14 over the top of the bed 56 of char in the gasification zone 34. These tars, asphalts and gaseous pyrolysis products and char are mixed with hot excess air-containing combustion product gases introduced into the pressure vessel 12 from the riser/burner 38 through conduit 44 so as to provide for the combustion of these tars, asphalts and gaseous volatiles and some of the carbon in the char in a combustion zone 58 located in the upper region 17 of the pressure vessel 12 above the gasification zone 34. The combustion of these products in the combustion zone 58 increases the temperature of the mixed char, pyrolysis gases, and steam introduced into the riser/burner 38 to a maximum temperature of about 2300° F. so as to provide a significant portion of the heat energy needed in the endothermic gasification reaction for the gasification of carbon in the char. Preferably, this combustion temperature is maintained at a temperature of no greater than about 2300° F. so as to avoid the softening of the char and/or fusing of the ash in the char which could lead to undesirable agglomeration of the char particulates and thereby interfere with the downflow of the char through the gasification zone 34.

In the top or upper region of the char bed 56 which is at a temperature in the range of about 2000° to 2300° F., sufficient to effect the thermal cracking of the tars and oils discharged from the pyrolyzer chamber 14, the char undergoes an endothermic gasification reaction as provided by the well known steam/carbon and/or $CO_2$/carbon reactions for substantially depleting the carbon from the char while generating high BTU fuel gas. This endothermic reaction consumes energy resulting in a reduction of the temperature of the fuel gas and the char as they flow downwardly through the gasification zone 34 until the temperature is reduced to about 1200°–1300° F. As pointed out above, the presence of the catalyst on the char in the gasification zone 34 permits appreciable gasification of carbon in char to occur as the temperatures in the gasification region are decreasing to about 1200° F. At temperatures less than about 1200° F., the endothermic gasification reaction substantially ceases and fuel gas is withdrawn from the gasifier through the annulus 30. Upon completion of this endothermic gasification reaction, about 80–90 percent of the carbon in the char is consumed with resulting ash with the balance of the carbon contained in the ash entering the upper end of the standpipe 36.

The standpipe 36 is of a sufficient length to provide for a pressure buildup to a pressure corresponding substantially to that within the pressure vessel 12 before the ash is entrained into the riser/burner 38. This pressure buildup is a necessary feature since the gaseous products discharged from the riser/burner 38 are injected into the top of the pressure vessel 12, thus requiring that the pressures of these injected gases be at least as great if not greater than that of the enclosed volume within the pressure vessel 12.

Excess air in the amount of about 40 to 50 percent greater than the stoichiometric amount required for the exothermic combustion of the carbon in the char in the stand pipe 36 is used in the riser/burner 38 for the combustion of essentially all of the carbon remaining in the ash discharged from the pressure vessel.

The single cyclone 42 at the end of the vertical tubular riser section 40 separates the solid ash particulates from the gaseous combustion products. The particulate removing efficiency operation of this cyclone 42 should be in the order of about 80–90 percent but such a high efficiency is not essential to the present invention since any particulates in the combustion product gases discharged from the cyclone 42 will be returned to the gasifier 10 for subsequent recycling and collection. Alternatively, a second cyclone of a higher efficiency may be placed in conduit 44 downstream of the cyclone 42 for removing a significant amount of the solids remaining in the stream of gaseous combustion products after the passing thereof through the cyclone 42.

The important features of the present invention include the uniform dispersion of the catalyst over the char in the bed 56 in the gasification zone 34 and in the recovery and the recycling of the catalyst discharged from the gasifier. As the ash is discharged from the gasifier 10 into the standpipe 36 the catalyst is in solid form and supported on and in the ash. However, once in the riser/burner 38 the temperature of these solids as defined by the ash and catalyst, is raised through the combustion of the carbon in the ash to a temperature of about 2300° F. However, if the cyclone 42 can accept slag, which is usually formed at temperatures greater than about 2300° F., then higher temperatures up to about 2800° F. can be utilized in the riser/burner 38 for vaporizing the catalyst on and in the ash. At a temperature of about 2300° F., the aforementioned catalysts, particularly the potassium compounds, will be vaporized and mixed with the gaseous products of combustion in the riser/burner 38 and then reintroduced into the pressure vessel 12 through the conduit 44 for effectively recycling the catalyst.

As the hot combustion product gases with the vaporized catalyst as produced in the riser/burner 38 and in the combustion zone 58 contacts the char in the bed 56 the endothermic gasification reaction is initiated so as to lower the temperature of the volatilized catalyst to a temperature in the range of about 1500° to 1800° F. where most catalysts employed in coal gasification systems will condense out of the combustion gases and onto the surface of the char in the bed 56 so as to provide a very fine and uniform distribution of the catalyst over the surface of the char in the bed 56. Also, this condensation of the catalyst effectively distributes or diffuses catalyst into the pores of the char so as to significantly enhance the endothermic gasification of the carbon in the char. As pointed out above, once this endothermic reaction temperature drops to less than about 1200° F., the resulting ash along with the catalyst contained thereon is introduced into the riser/burner 38 for vaporizing and removing the catalyst from the ash for recycling of the catalyst. In order to assure that sufficient catalyst is maintained in the reaction vessel 12 for an effective or efficient reaction, makeup catalyst may be introduced through conduit 52 coupled to the pressure vessel 12 or mixed with the coal particulates introduced through line 23 into the pyrolyzer chamber 14.

In a typical cycle of the gasification system of the present invention with the pyrolyzer chamber 14 operating at a temperature of 1600° F., with an air to fuel ratio of 9 lbs. air to 10 lbs. fuel, with the ash discharged from the pressure vessel 12 into the riser/burner 38 containing about 15 percent carbon, with combustion of carbon in the ash provided at about 47 percent excess air and 0.64 lbs. of steam per lb. of char to produce a 2300° F. exothermic reaction temperature in the riser/burner 38, and with the fuel gas discharge temperature at 1350° F., the fuel gas produced by the gasification reaction in the presence of a catalyst of potassium carbonate is expected to have a heat value corresponding to about 165 BTU/SCF. The heat value of this fuel gas is significantly greater than the approximately 100 to 135 BTU/SCF expected from conventional fixed-bed gasifiers and moving-bed gasifiers. The nominal composition of the fuel gas produced by this reaction is expected to be about 40% nitrogen, about 26% carbon monoxide, about 3.1% carbon dioxide, 16% hydrogen, 2.7% methane, 0.5% hydrogen sulfide, and about 12% water.

The steam necessary for the gasification reaction in the pressure vessel 12 may be introduced through conduit 46 along with the air into the base of the riser/burner 38. However, the riser/burner 38 can be operated at a temperature substantially higher than about 2300° F. and in the order of about 2500° to 2800° F. to assure the burnout of essentially all the carbon in the ash by utilizing only air in the riser/burner 38. Inasmuch as these higher temperatures will increase and raise the temperature of the ash solids to a slagging stage before they reach the cyclone 42, the required steam may be introduced through a conduit 60 and mixed with the solid and gaseous combustion products upstream of the cyclone 42 for cooling the solid and gaseous combustion products to a temperature below a slagging temperature of about 2300° F. before passing the solid combustion products into the cyclone 42.

It will be seen that the utilization of the stand pipe 36 and the riser/burner 38 separate from the pressure vessel 12 eliminates the need for a grate in the lower portion of the gasifier as in the aforementioned patent. Also, the utilization of the riser/burner 38 with excess air provides an efficient, low cost mechanism for the effective burnout of carbon in the ash to provide an environmentally acceptable waste product. Further, the injection of the relatively hot combustion gases from the riser/burner 38 into the combustion zone 56 overlying the bed 54 of char provides a significant part of the total heat energy required for driving the endothermic gasification reaction in the gasifier 10 in a manner substantially more efficient than heretofore obtainable.

what is claimed is:

1. Apparatus for the gasification of a carbonaceous material by means of an endothermic gasification reaction and the recycling of a catalyst used for promoting the gasification of the carbonaceous material, comprising: a gasification vessel containing a downward moving bed of carbonaceous material, a first conduit means for introducing a stream of carbonaceous material and air into the vessel to maintain said moving bed of carbonaceous material, means for initially introducing a quantity of catalyst into said vessel in an amount sufficient to promote the gasification of the carbonaceous material in said bed in the presence of the air by an endothermic gasification reaction for producing fuel gas and solid gasification products containing residual carbon, a second conduit means for removing the fuel gas from the gasification vessel, a combustion chamber means separate from said gasification vessel, a third conduit means for conveying the solid gasification products including any of said catalyst supported thereby from said gasification vessel into said combustion chamber means, a fourth conduit means for introducing a stream of air into the combustion chamber means in an amount at least sufficient for supporting combustion of residual carbon in the solid gasification products to produce solid and gaseous combustion products and provide a temperature in the combustion chamber means sufficient to volatilize the catalyst supported on the solid gasification products, particulate removing means coupled to said combustion chamber means for separating solid combustion products from the gaseous combustion products and the volatilized catalyst, and a fifth conduit means for conveying the volatilized catalyst and the gaseous combustion products from said combustion chamber into said gasification vessel for providing heat energy for driving said endothermic gasification reaction and for the contact of the volatilized catalyst with the carbonaceous material in said bed.

2. Apparatus for the gasification of a carbonaceous material by means of an endothermic gasification reaction and the recycling of a catalyst used for promoting the gasification of the carbonaceous material as claimed in claim 1, wherein said gasification vessel is a vertically oriented vessel having a top region therein overlying said bed of carbonaceous material and a bottom region substantially underlying said second conduit means and an intermediate region containing a substantial portion of said bed, wherein said second conduit means has an opening thereof communicating with said intermediate region for receiving the fuel gas from the gasification vessel, wherein said third conduit means comprises an elongated and vertically oriented stand-pipe having a top open end communicating with said lower region of said gasification vessel for receiving solid gasification products therefrom, wherein said fifth conduit means communicates with said top region of said gasification vessel, and wherein said top region defines a combustion zone overlying the bed of carbonaceous material for the combustion of combustible gases and carbon bearing material for providing a substantially portion of said heat energy.

3. Apparatus for the gasification of a carbonaceous material by means of an endothermic gasification reaction and the recycling of a catalyst used for promoting the gasification of the carbonaceous material as claimed in claim 2, wherein said first conduit means comprises vertically oriented and elongated pyrolysis chamber means substantially centrally disposed in said gasification vessel and substantially encompassed by said bed for substantially converting said carbonaceous material to char, wherein the elongated chamber means has an upper opening communicating with said upper region of said gasification vessel for introducing the char into said gasification vessel atop of said bed.

4. Apparatus for the gasification of a carbonaceous material by means of an endothermic gasification reaction and the recycling of a catalyst used for promoting the gasification of the carbonaceous material as claimed in claim 3, wherein said combustion chamber means comprises a vertically oriented riser/burner having a first end connected to a lower end of said stand-pipe for receiving the solid gasification products therefrom and a second end coupled to said particulate removing means, wherein said fourth conduit means is coupled to the riser burner at said first end for the introduction of said stream of air into the riser/burner and the propelling of the solid gasification products in said riser/burner.

5. Apparatus for the gasification of a carbonaceous material by means of an endothermic gasification reaction and the recycling of a catalyst used for promoting the gasification of the carbonaceous material as claimed in claim 1, wherein said particulate separating means comprises a cyclone separator.

6. Apparatus for the gasification of a carbonaceous material by means of an endothermic gasification reaction and the recycling of a catalyst used for promoting the gasification of the carbonaceous material as claimed in claim 1, further including a sixth conduit means for introducing a stream of steam into the combustion chamber means adjacent said second end thereof.

* * * * *